(12) United States Patent
Sridharan et al.

(10) Patent No.: US 7,774,741 B2
(45) Date of Patent: Aug. 10, 2010

(54) AUTOMATICALLY RESOURCE LEAK DIAGNOSIS AND DETECTING PROCESS WITHIN THE OPERATING SYSTEM

(75) Inventors: Baskar Sridharan, Redmond, WA (US); Jason Stewart Wohlgemuth, Duvall, WA (US); Abdelsalam A. Heddaya, Bellevue, WA (US); Elsie Nallipogu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1025 days.

(21) Appl. No.: 11/438,791

(22) Filed: May 22, 2006

(65) Prior Publication Data
US 2007/0271418 A1 Nov. 22, 2007

(51) Int. Cl.
G06F 9/44 (2006.01)
G06F 9/445 (2006.01)
(52) U.S. Cl. .................. 717/100; 717/101; 711/170
(58) Field of Classification Search ......... 717/100–102, 717/124–132; 711/170
See application file for complete search history.

(56) References Cited

U.S. PATENT DOCUMENTS

| | | | | |
|---|---|---|---|---|
| 5,689,707 | A * | 11/1997 | Donnelly | 1/1 |
| 5,903,900 | A * | 5/1999 | Knippel et al. | 1/1 |
| 5,953,530 | A * | 9/1999 | Rishi et al. | 717/127 |
| 6,115,782 | A * | 9/2000 | Wolczko et al. | 711/100 |
| 6,425,119 | B1 * | 7/2002 | Jones et al. | 717/100 |
| 6,513,154 | B1 * | 1/2003 | Porterfield | 717/101 |
| 6,550,057 | B1 * | 4/2003 | Bowman-Amuah | 717/126 |
| 6,654,948 | B1 * | 11/2003 | Konuru et al. | 717/127 |
| 6,817,011 | B1 * | 11/2004 | Reynolds | 717/130 |

(Continued)

OTHER PUBLICATIONS

Xu et al, "Precise memory leak detection for java software using container profiling", ACM ICSE, pp. 151-160, 2008.*

(Continued)

*Primary Examiner*—Anil Khatri
(74) *Attorney, Agent, or Firm*—Marshall, Gerstein & Borun LLP

(57) ABSTRACT

The resource leak detector attempts to identify the causes of resource leaks and fix the causes if possible. At a minimum, the located resource leaks are reported to an operating system manufacture for additional study and possible correction, either by the operating system manufacturer or the application manufacturer that is causing the resource leak. In an embodiment, in operation, a leak trigger for starting leak detection is started. If the leak trigger is activated, leak detection is started when an application begins. Resource allocations are tracked for the leaked resource and each leaked resource is matched to a corresponding allocation call stack. A type of the leaked resource may be identified. The leak detection and the leak trigger may be controlled according to at least one of a local policy and a global policy. The local and the global policy may be updated dynamically such as by using aggregated occurrences of applications that met the local policy or by matching a plurality of distinct types of leaked resources to the same call stack. A leak report may be generated of resource leak data where the leak report is stored locally or communicated to a local aggregation database or remote aggregation database. The leak report may include total leaked allocations, total size of leaked allocations, total outstanding allocations, total size of outstanding allocations and matched allocation call stacks. The leaked resource may be automatically reclaimed and a fix to the leaked resource may be created and applied automatically.

17 Claims, 6 Drawing Sheets

U.S. PATENT DOCUMENTS

| | | | | |
|---|---|---|---|---|
| 6,832,302 | B1* | 12/2004 | Fetzer et al. | 711/170 |
| 7,178,132 | B2* | 2/2007 | Pierce | 717/127 |
| 7,210,118 | B2* | 4/2007 | Hastings | 717/100 |
| 7,272,815 | B1* | 9/2007 | Eldridge et al. | 717/101 |
| 7,487,321 | B2* | 2/2009 | Muthiah et al. | 711/170 |
| 7,493,594 | B2* | 2/2009 | Shenfield et al. | 717/107 |
| 7,539,833 | B2* | 5/2009 | Krauss et al. | 711/170 |

OTHER PUBLICATIONS

Willard et al, "Autonomous garbage collection resolving memory leaks in long running network applications", IEEE, pp. 886-896, 1998.*

Chen et al, "Aspect based instrumentation for locating memory leaks in Java programs", IEEE COMPSAC, pp. 23-28, 2007.*

Hirzel et al, "On the usefulness of type and liveness accuracy for garbage collection and leak detection", ACM Trans. on Prog. Lang. and Sys. vol. 24, No. 6, pp. 593-624, 2002.*

Nguyen et al, "Detecting and elimination memory leaks using cyclic memory allocation", ACM ISMM, pp. 15-29, 2007.*

Bond et al, "Tolerating memory leaks", ACM OOPSLA, pp. 109-125, 2008.*

* cited by examiner

AUTOMATICALLY RESOURCE LEAK DIAGNOSIS AND DETECTING PROCESS WITHIN THE OPERATING SYSTEM

BACKGROUND

Resource leaks such as memory leaks are a huge source of customer pain and occur very frequently in released software. A resource leak is a failure to release a resource such as virtual memory that an application will never use. As resources are finite, if part of the resource is not released then additional parts of the resource must be used which causes unnecessary stress on the system and can lead to resource exhaustion. Resource exhaustion can lead to performance degradation which in turn can cause system instability.

SUMMARY

While many programs exist to diagnose resource leaks, there are no known programs that proactively and automatically detect, diagnose and report resource leaks on the customer's machine within the operating system. The resource leak detector attempts to identify the causes of resource leaks and fix the causes if possible. At a minimum, the located resource leaks are reported to a developer that owns the leaking code for additional study and possible correction, either by the operating system manufacturer or the application manufacturer that is causing the resource leak.

DRAWINGS

Figure 5:
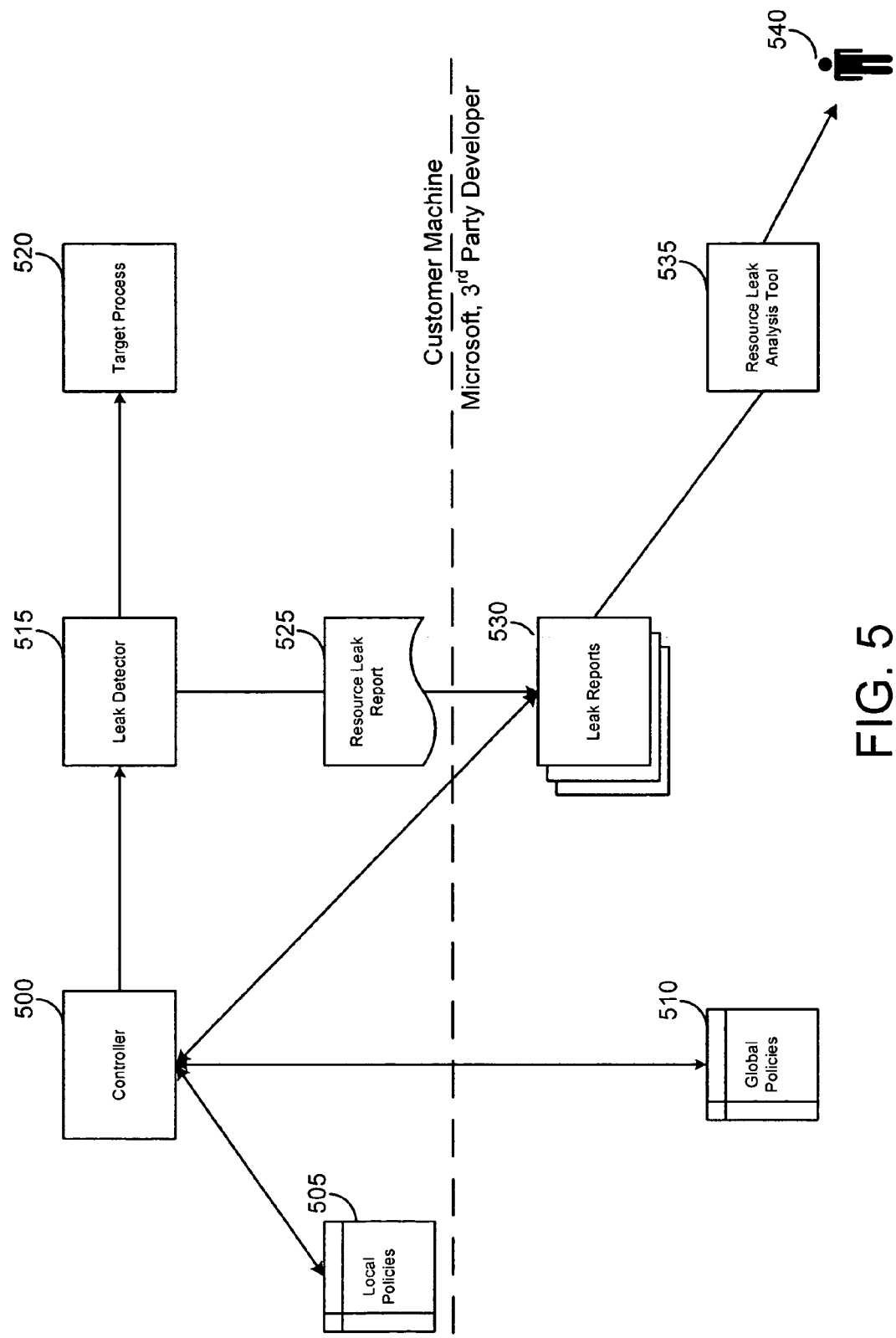
Figure 6:
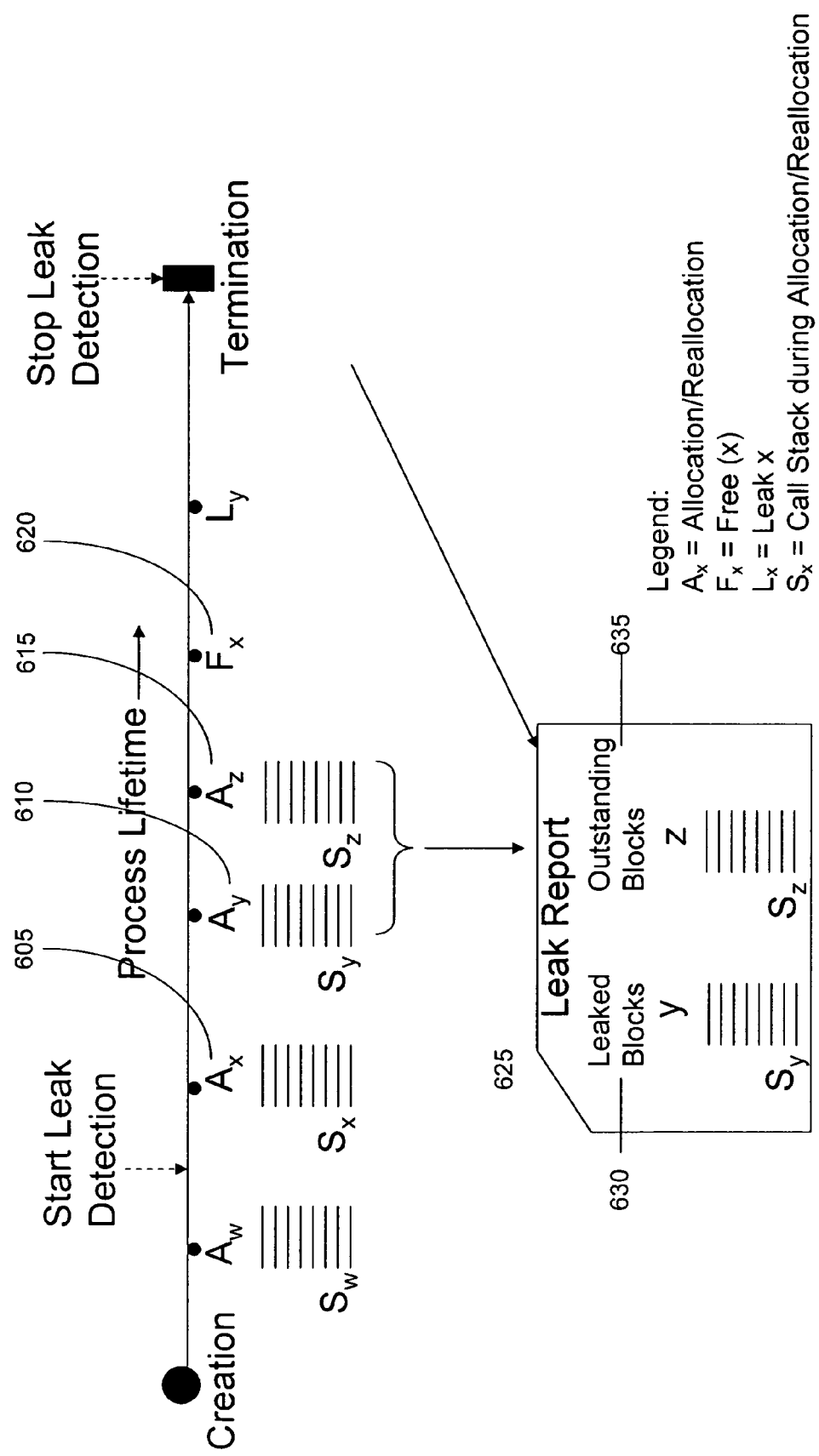

FIG. 5 may be an illustration in block form of one embodiment of implementing the method; and FIG. 6 may be a graphical illustration of the method in practice.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
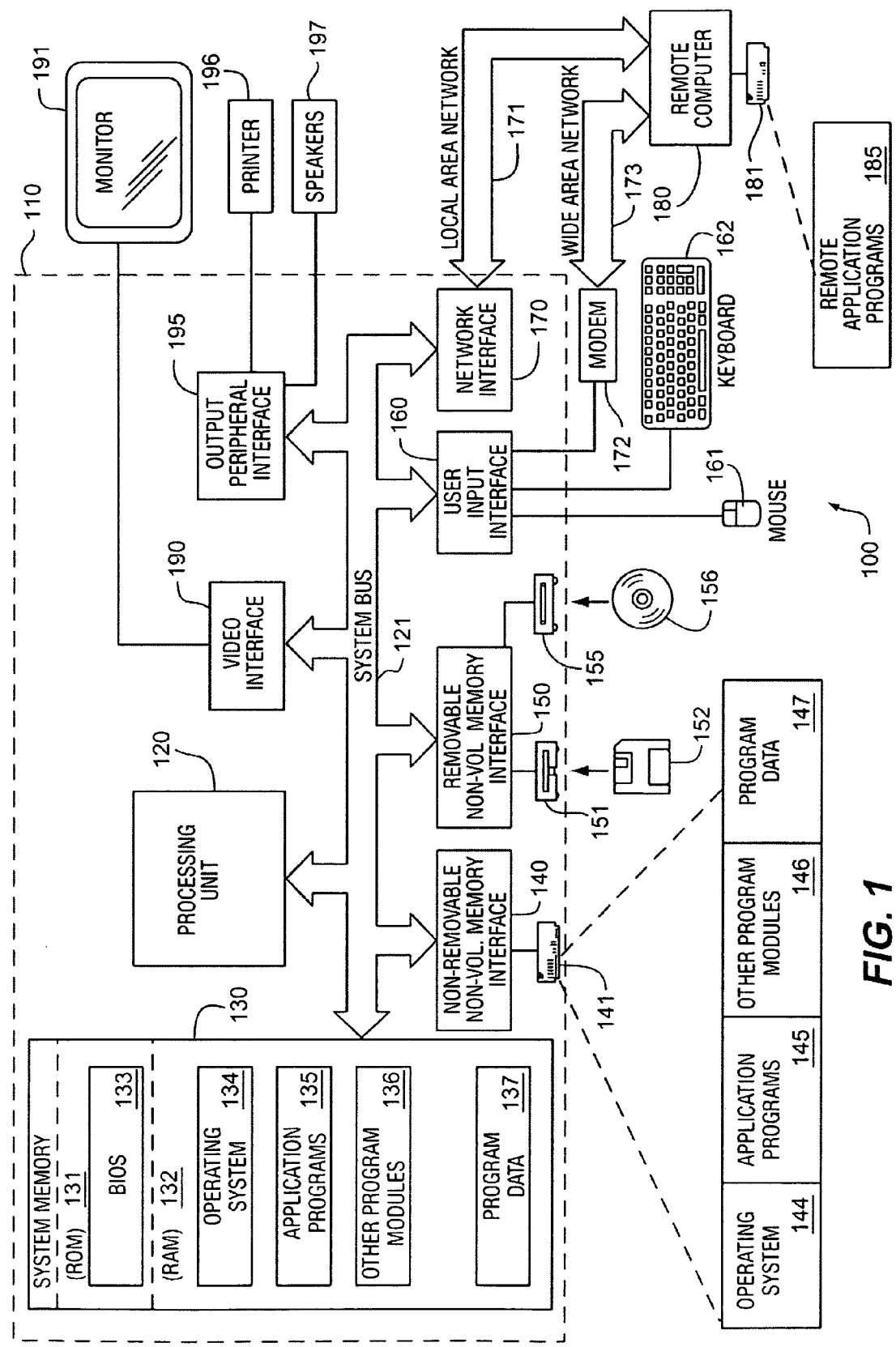
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
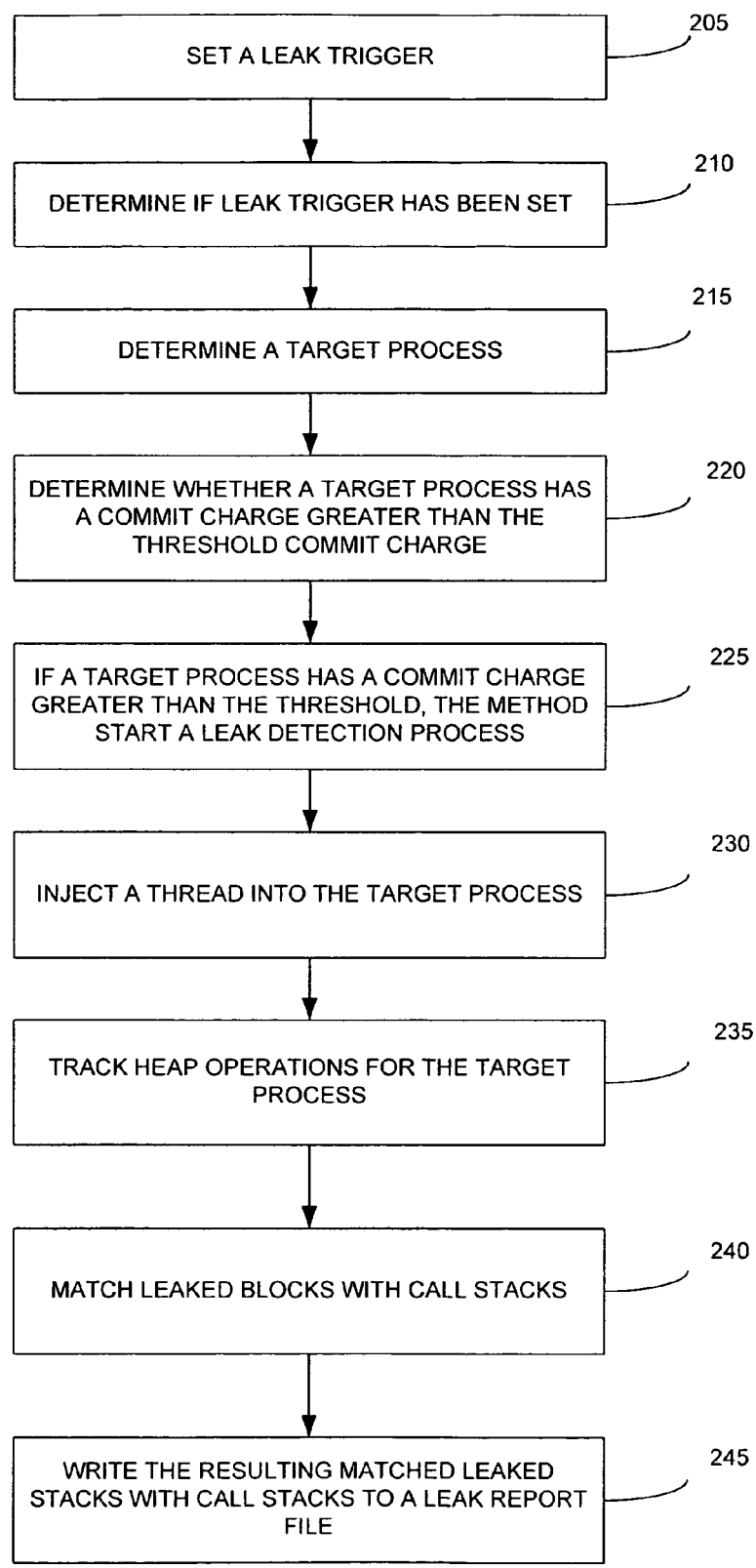
FIG. 2 is an illustration of a sample leak detector method.

FIG. 2 may be an illustration of a method detecting an identifying cause of resource leaks in a computer such as the computer described in FIG. 1. Resource leaks are a huge source of customer pain and occur very frequently in released software. A resource leak is a failure to release virtual memory that an application will never use. Resource leaks may cause the application to consume more and more memory. As virtual memory is a finite resource, resource leaks may prevent the leaking application and also other applications from getting more virtual memory. This may lead to performance degradation and system memory exhaustion which in turn can cause system instability.

Resource leaks may come in many forms. For example, if memory is the resource being studied, a garbage or leaked block may be a memory block that that has no references to the allocated memory blocks. An outstanding memory block may be a memory block that is allocated but not freed before process is terminated. Blocks that are allocated but not accessed for a period of time may be thought of as inefficient use of memory.

At block 205, the method may set a leak trigger. The leak trigger may take a variety of forms. In one embodiment, the trigger may be activated when a trigger such as a total read/write memory charge rises above a threshold. The threshold read/write memory charge may be the maximum of a read/write memory floor and the minimum of a read/write memory threshold multiplied by the size of RAM and a read/write memory ceiling. Other thresholds may be possible and are contemplated. In another embodiment, the method may not operate continuously but may check occasionally, such as every five minutes. The timer may be the trigger that may indicate that it is again time to check for leaks.

In another embodiment, the method may look at the rate of increase in resource usage, based on threshold of the total amount the resource. For example, if the current rate of increase in use of a resource is such that resource exhaustion is predicted to occur, then diagnostics may be started well before exhaustion actually occurs. In another embodiment, a user may be able select when to trigger the method. For example, if a user notices their system becoming slow or if a single application has slow responsiveness, the user may select to begin the method. Other triggers may be based on the amount of usage of an application where more commonly used applications can have stricter requirements and lower thresholds to trigger the method as these applications are of greater importance to the user.

At block 210, the method may determine whether the leak trigger has been tripped. For example, in block 205, a threshold read/write memory charge may be set and the method may determine whether the threshold has been passed. In another embodiment, the threshold may be a period of time and the method may determine if the requisite time has passed, thereby setting the trigger.

At block 215, the method may determine a target process. The target process may be the process whose read/write memory charge is the largest. In an alternative, the target process may be the process for which the read/write memory charge has increased in size the most over a given period of time. Other ways of identifying a target process are contemplated.

At block 220, the method may determine whether a target process has a read/write memory charge greater than the threshold read/write memory charge from block 210. At block 225, if a target process has a read/write memory charge greater than the threshold, the method may start a leak detection process as it is likely that a leak is present.

The leak detection process may have several blocks. At block 230, the method may inject a thread into the target process. The thread may be injected during normal execution of the target application. The thread may be a thread that creates a snapshot of the target process address space and it may report data such as what code took what size block of memory. After the process is complete, it may be cleaned up and shutdown.

Figure 3:
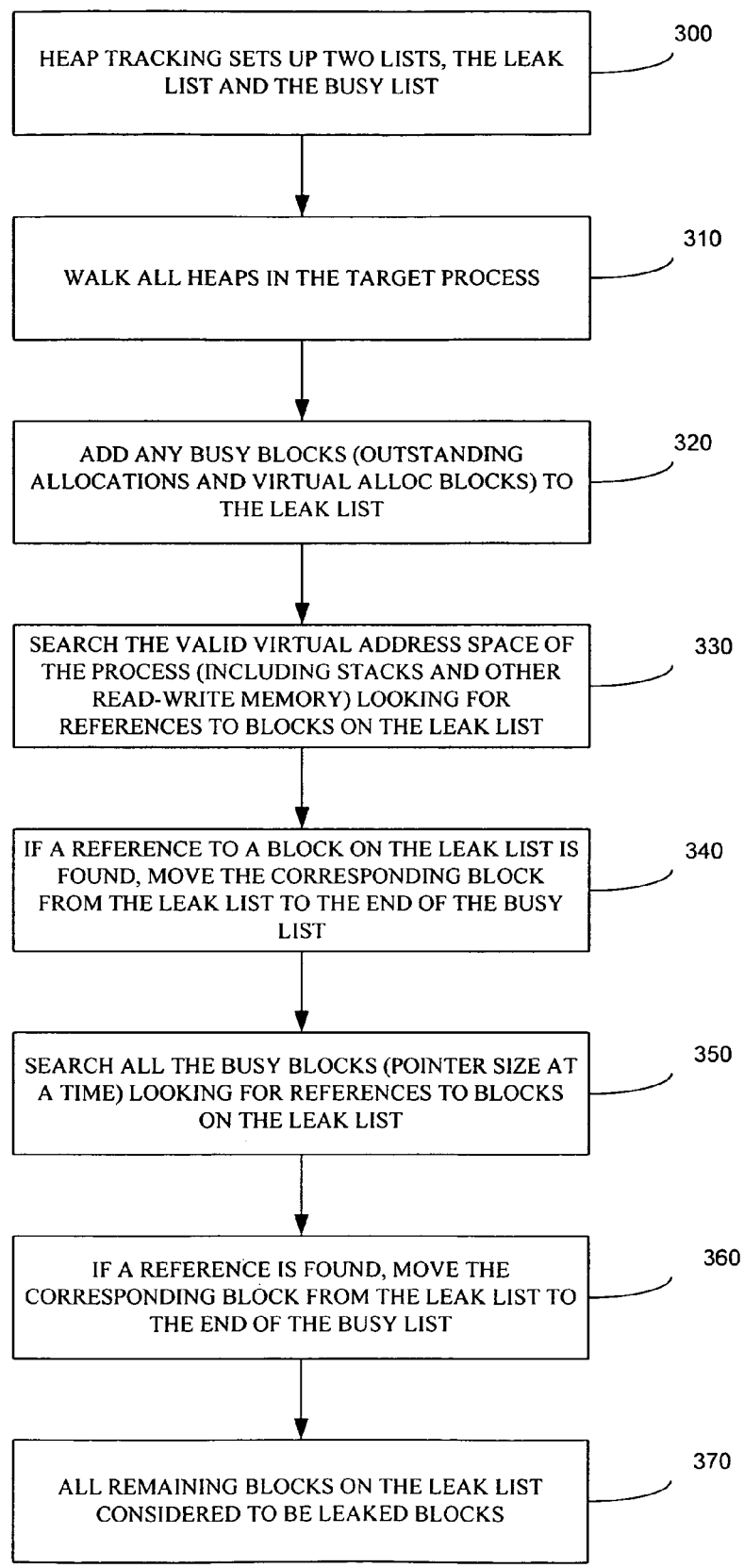
FIG. 3 is an illustration of a method of heap reachability analysis.

At block 235, the method may identify unreachable heap blocks, which are leaked by definition, for the target process. FIG. 3 may be an illustration of one manner of detecting unreachable heap blocks, i.e., reachability analysis. In one embodiment, at block 300, the heap reachability analysis may set up two lists, the leak list and the busy list and both lists may be empty upon initialization. At block 310, all heaps in the target process may be walked or reviewed by the method. At block 320, any busy blocks (outstanding heap allocations and virtual allocation blocks) may be added to the leak list. At block 330, the valid virtual address space of the process (including stacks and other read-write memory) may be searched (pointer size at a time) looking for references to blocks on the leak list. At block 340, if a reference to a block on the leak list is found, the corresponding block is moved from the leak list to the end of the busy list. Blocks which may be contained within the in-proc leak detection heap may not added to the busy list as this may prevent false negatives caused by the leak detection code itself. At block 350, all the busy blocks may be searched (pointer size at a time) looking for references to blocks on the leak list. At block 360, if a reference is found, the corresponding block may be moved from the leak list to the end of the busy list. At block 370, all remaining blocks on the leak list may be considered to be leaked blocks.

Referring again to FIG. 2, at block 240, the method may match leaked blocks with call stacks. For example, a variable that is constructed but is never deconstructed may be noted. For example, the method may find a called block of memory and combine it with the called symbols to identify the code line that called alloc. This code line will be compared to the variable that was leaked and then it may be determined which code block should release the variable.

At block 245, the method may write the resulting matched leaked stacks with call stacks to a leak report file. Call stacks may be matched with leaked blocks (explicit leaks) and may be ordered by size of all the leaked blocks. Call stacks may be matched with outstanding allocs (implicit leaks) which are ordered by size of all the outstanding allocs. Data is written to the file until the max file size is reached which is set in advance. The call stacks and associated information may be ordered (in descending order) based on the size of the total leaked allocations matched with that call stack. The outstanding allocations may be matched with a call stack and may be bound to ten different sizes. The top ten may be selected based on this formula:

$$(\text{Size of allocation}) * (\text{number of allocations of that size}).$$

Figure 4:
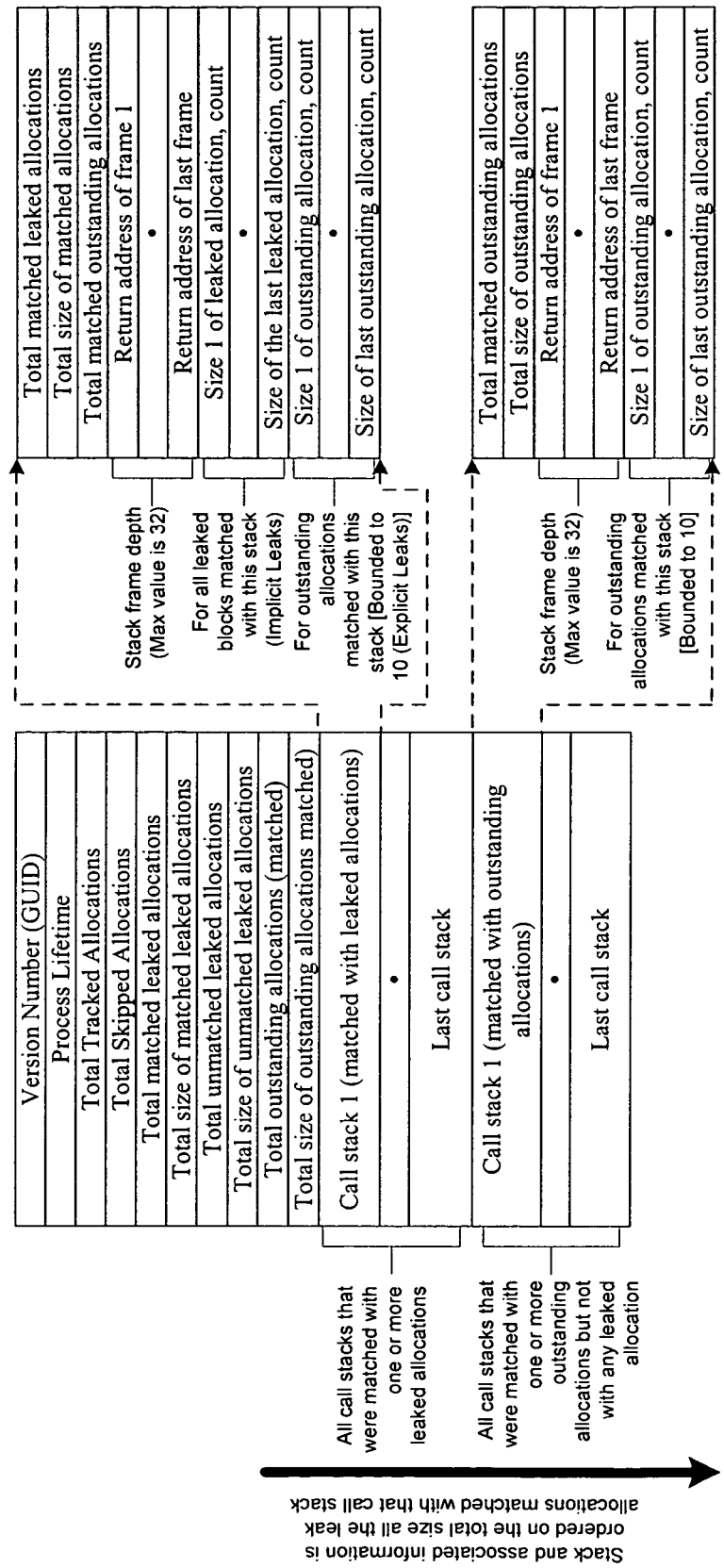
FIG. 4 is a sample report generated by the leak detector.

The leak report may be communicated to a leak report aggregator. The application resource leaks may be analyzed to determine if there is a root application cause for resource leaks. More specifically, creating a mini dump of the target process may include creating a report and that report may be compressed to reduce its size. The report may be communicated to a leak report aggregator. FIG. 4 may be a sample report. The report may list the following data:

| | |
|---|---:|
| Process Lifetime = | 15 seconds. |
| Results Flags = | 0x00000000 |
| | (bit 0 == 1 if 64bit) |
| Total Leaked Allocations = | 5 |
| Total Size of Leaked Allocations = | 20480 |
| Total Unmatched Leaked Allocations = | 15 |
| Total Size of Unmatched Leaked Allocations = | 214 |
| Total Outstanding Allocations = | 151 |
| Total Size of Outstanding Allocations = | 432492 |
| Total Tracked Allocations = | 161 (100%) |
| Total Skipped Allocations = | 0 (0%) |
| Leaking Stacks = | 1 |
| Outstanding Stacks = | 8 |
| Written Leaking Stacks = | 1 |
| Written Outstanding Stacks = | 8 |

There may be an additional page of the report that lists the leaked stacks:

| Leaking Stacks (in dec order (size of leaked allocs)) | |
|---|---:|
| Total Leaked Allocations = | 5 |
| Total Size of Leaked Allocations = | 20480 |
| Total Outstanding Allocations = | 45 |
| Total Size of Outstanding Allocations = | 184320 |

00: (0000000077f538fd) ntdll!RtlAllocateHeap+0x210 [d:\winmain\base\ntos\rtl\heap.c:1670]
01: (00000000010013b1) leakyapp!F5+0x21 [d:\users\baskars\radardemo\a.cpp:85]
02: (00000000010013e3) leakyapp!GenerateLeakedBlocks+0x23 [d:\users\baskars\radardemo\a.cpp:94]
03: (0000000001001484) leakyapp!wmain+0x24 [d:\users\baskars\radardemo\a.cpp:121]
04: (00000000010017ab) leakyapp!_tmainCRTStartup+0x10f [e:\nt\base\crts\crtw32\dllstuff\crtexe.c:688]
05: (0000000077e4ee88) kernel32!BaseThreadInitThunk+0xe. [d:\winmain\base\win32\client\baseinit.c:792]
06: (0000000077f44f5a) ntdll!_RtlUserThreadStart+0x23 [d:\winmain\base\ntos\rtl\rtlexec.c:2630]

Leaked Allocation Sizes:

| Leaked Allocation Sizes: | |
| --- | --- |
| Alloc Size 0x1000 × 5 Allocations = | 20480 total bytes |
| Outstanding Allocation Sizes: | |
| Alloc Size 0x1000 × 45 Allocations = | 184320 total bytes |

If the system is set up not to report details of problems to the software manufacturer, few details may be collected and reported such as the application name and application version. In addition, the method may not continue with leak detection. If the user has opted-in to provide details, a reporting application may check to see if the required maximum number of reports has been sent. If the maximum has been reached then the method may not continue with leak detection. Otherwise the method will continue with leak detection and the leak event is sent after leak detection is run. Note that the maximum number of reports on the server-side can be set to 0. Therefore, the leak detection could be completed disabled using this mechanism. In the more detailed report, the following data may be sent to the operating system manufacturer:

1. Application Name
2. Application Version
3. LOG2 (Total size of all leaked blocks)
4. LOG2 (Number of leaked blocks)
5. LOG2 (Process lifetime)

This reporting event is sent by the leak detection process after leak detection has completed on the target process. If the system has opted-in, the report such as a cabinet (cab) file and second level data is not required then just the parameters may be sent immediately to the software manufacturer. If the system has not opted-in then the report is queued and the system/user is periodically asked if they would like to upload the data.

The method may use local policies and global policies to adjust the leak detection process. For example, a local process may record that the leak detection process has been performed on the target process. Related, the method may determine whether the leak detection process has been performed on the target process previously as the leak detection process may be operated once per boot session, or once every six months, for example. The limit my be set to reduce the user impact but still identify all the leaks.

A global policy may be set at a back end rather than at the user's system. For example, a backend policy may limit the number of leak detectors that operate on different computers during a given period of time. By watching multiple computers over time, there will be a higher probability of catching all the leaks.

The reporting may use two communication channels. The first channel may communicate to the user systems regarding when the leak detector should operate while the second channel may carry the data regarding the leak. Of course, more or less channels may be used. In addition, the channels may use the same single physical medium.

The method may also set a level of interference within a session. While tracking resource leaks is important, not being a nuisance to users may be an even greater concern. Accordingly, the method may set a level of overhead the leak detection process is allowed to use. The acceptable level of overhead may be determined by setting an initial quota of memory, capturing a first time stamp, performing a stack tracking, capturing a second time stamp, determining a stack tracking time by subtracting the first time stamp form the second time stamp, subtracting the stack tracing time from the quota and continuing the method while the quota is positive. CPU overhead may also be throttled. For example, the method may pre-compute the quota of CPU cycles to be spent for stack tracing in a fixed time interval and the maximum CPU cycles may be based on the CPU frequency. The CPU cycles may be computed for each stack tracing operation and deducted from the quota for the current time interval.

Universal Hashing for Leak Detection

During initialization of a call stack tracker, the total number of slots may be determined for (a) the stack hash table S that contains the hashes of the allocated heap blocks, and (b) a random number table R that contains a list of random numbers used to generate the hash of a call stack. The size N of S (number of slots) may be pre-determined to be a specially chosen prime-number. The size of R may be determined by the maximum size of a pointer, i.e., the table consists of as many slots as there are bytes in the pointer. For example, for a 32-bit pointer, the random number table R consists of 4 slots, with each slot containing a randomly generated number modulo the size of the stack hash table S.

When a heap block is allocated or freed, the hash H of the resource identifier RID is computed using the formula:

$$H = \text{SUM byte}[k] * \text{random}[k] \bmod N (\Sigma_{k=0}^{n-1} \text{byte}[k] * \text{random}[k]) \% N,$$

where byte[k] is the kth byte of the RID, random[k] is the kth slot in the random number table, and N is size of S, chosen as a prime number. H may now be the index in table S. As a result, the algorithm may be fast and may result in few collisions.

Once a cause of a resource leak is identified, the operating system may attempt to correct the problem. If the problem is in the operating system itself, a patch may be created and distributed. If the problem is with an application that uses the operating system, the operating system manufacturer may report the problem to the application manufacturer, including a proposed solution to the resource leak problem. In some cases, with permission of the other application manufacturer, the operating system manufacturer may distribute a fix to the resource leak problem in a non-operating system application. In another implementation the OS can fix the leak by, for example, just releasing and reclaiming the memory or resource that is leaked (i.e. the types of leaks to which an application no longer has a reference.)

FIG. 5 may be an illustration in block form of one embodiment of implementing the method. A controller 500 may use local policies 505 and global policies 510 to create rules when the leak detector should operate. The controller 500 may communicate these rules to the leak detector 515 which may operate on the target processes 520. Based on the operation on the target processes 520, heap leak reports 525 may be created. The leak heap reports 525 may be used to create more global leak reports 530 at a back end, such as at the software developers back-end. The global leak reports 530 may be analyzed by a resource leak analysis tool 535.

The resource leak analysis tool 535 may gather leak reports 530 and analyze them in a variety of ways. The leaks may be separated by code module and the programmer 540 responsible for the code module may review and respond to the report. In addition, the reports may be further broken down by leak size as the large leaks may be of greater importance that smaller leaks. Further analysis and breakdown may be possible. Solutions to the leaks may be implemented or created and implemented, as needed. For example, the analysis tool may collect the leak reports and aggregate them in an attempt to find a single leak such as a variable that does not have a deconstructor. The analysis tool may then find the called block that allocated the resource, such as memory, and then combine the called block with the relevant symbols to create a code line that caused the leak. The code line may then indicate the variable that was leaked. From there, the method may determine the module that should free the resource, such as the code module that should deconstruct the variable. In one example, the stack may have multiple frames, each of which may have a return address. These return addresses may be used to find a cause of a leak. These solutions may be communicated as global policies 510 to improve the leak analysis process.

The leak analysis tool 535 may also follow logic in finding the lowest common denominator (LCD) in a leaky stack. Looking at stack A (below) first, the method may compare A with the rest of the leaky call stacks in the same report to identify the lowest (as determined by the frame number) common frame. In this example, the frames 00 through 06 are common between stacks A and B. Accordingly, the leak must be within these frames. The LCD frame is 06. The first three frames may be eliminated as they are helper functions. The stack frame is now narrowed to the frames in italics (frames 3-6). A data flow analysis method (described below) may be used to determine the variable and the stack frame that is the cause for the leak (leaky function). In many cases, (i) the LCD frame is leaky function, and (ii) the leaky function that is the cause of the leak is also the one that needs to free the stack.

Once the leaky function (frame) is identified, other stacks in the other leak reports may be analyzed to determine the stacks that have the same leaky function. Many of these leak reports may be from various other applications resulting in the aggregation of leaky call stacks. In the case where a class and all it member variables are leaked, the leaky call stack may be frame #=LCD+1.

In one embodiment, the method identifies the call stacks that the method should compare stack A to by looking for the allocating frame. In stack A, the allocating frame is 03. Comparing stack A to an "unrelated" (a stack that does not involve the current allocating frame) call stack may leave only RtlAllocateHeap as LCD. To prevent this, the method may compare the current stack (stack A) only with stacks that contain the allocating frame.

Stack A:
00: (0000000077f5106f) ntdll!RtlAllocateHeap+0x209
01: (0000000077e5cdb0) kernel32!LocalAlloc+0x52
02: (0000000075851881) M1!operator new+0x10
03: (00000000758556cf) M1!A::Init+0x178
04: (00000000758568a0) M1!B::InitFC+0xca
05: (00000000758567fb) M1!B::CC+0x3a
06: (00000000758567b1) M1!B::Init+0xa
07: (000000007585987e) M1!GUCHData+0xa
08: (0000000075864052) M1!IsCModified+0x33
09: (0000000075862a3b) M1!Start+0x1ea
10: (000000007585fd2a) M1!SendRequest+0x60
11: (000000007585fbba) M1!CF::Run+0x39
12: (000000007585fdd4) M1!CF::RunWorkItem+0x79
13: (0000000076d35055) M2!ExecuteWorkItemThreadProc+0xe
14: (0000000077f077f5) M2!WorkCallback+0x82
15: (0000000077f1291d) M2!WorkerThread+0x4a0
16: (0000000077e60bc5) M2!BaseThreadInit+0xe
17: (0000000077f3692e) M2!ThreadStart+0x23

Stack B:
00: (0000000077f5106f) ntdll!RtlAllocateHeap+0x209
01: (0000000077eScdb0) kernel32!LocalAlloc+0x52
02: (0000000075851881) M1!operatornew+0x10
03: (00000000758556cf) M1!A::Init+0x178
04: (00000000758568a0) M1!B::InitFC+0xca
05: (00000000758567fb) M1!B::CC+0x3a
06: (00000000758567b1) M1!B::Init+0xa
07: (0000000075859701) M1!GetCurrentSettings+0xa
08: (00000000758596ce) M1!SettingsChanged+0x12
09: (000000007585ba79) M1!FixProxySettings+0x3c
10: (000000007585fe60) M1!FixSettings+0x70
11: (000000007585fea2) M1!SendRequest+0x51
12: (000000007585fbba) M1!CF::Run+0x39
13: (000000007585fdd4) M1!CF::RunWorkItem+0x79
14: (0000000076d35055) M2!ExecuteWorkItemThreadProc+0xe
15: (0000000077f077f5) M2!WorkCallback+0x82
16: (0000000077f1291d) M2!WorkerThread+0x4a0
17: (0000000077e60bc5) M1!BaseThreadInit+0xe
18: (0000000077f3692e) M2!ThreadStart+0x23

In another embodiment, another algorithm may be used for analyzing leaks using data flow: Frame numbers start from 0 (top of the stack) and increase downwards. In practice, the top most frame in the stack is RtlAllocateHeap. In any leaky stack, there may be exactly one leaky frame. The method may perform the following blocks:

1. Set Frame=F (where F is the first frame below malloc/new/RtlAllocateHeap/LocalAlloc/ReAlloc etc);

2. From the line number and file, obtain the variable to which this block is allocated. Trace this variable until the end of the function:

a. If the variable is a local variable, then trace it to see if it is ever allocated to any other type (such as global, class member variable, return variable, or parameter). If it is, then chase these variables until the end of the function;

b. If the variable that holds the only reference to the resource is ever overwritten with another value, then this is the frame that causes the leak, irrespective of the variable type;

c. If the variable is never overwritten and the method has completed analyzing all the lines in this function, then the method may determine the "final variable" that holds this block address. If the "final" variable is:

i. Local Variable: This frame may be the cause of the leak.
ii. Global Variable:

1. If the previous value of this variable is freed, and then the new block is allocated, then it is implied that some other code path is trampling on the global variable. These types of problems may be very hard to find the cause. In this case, the method may identify the place in the code that should free the variable by performing the control and data flow analysis of the code that manipulate this global variable. This code that is supposed to free the variable may not be identified in the call stacks. Typically, the method identifies functions, called "cleanup" functions, that perform the job of freeing such variables. The cleanup functions may be the one of the last functions that is invoked before the component (DLL or EXE) itself is unloaded or terminated. The cleanup function may be specified explicitly as a list per component or these functions may be well-known functions. In the case of the class member variables that are leaked, well-known cleanup functions may be the class destructors. Hence, if a class member variable is leaked, then the destructors are checked to determine if the variables must be freed in these functions. If the variable V is a global variable, and V is defined in a DLL, and hence belongs to the DLL, then V must be freed at some time before the DLL's unload function is called. Such a function is an example of a well-known cleanup function that is present and called in every DLL. If the variable V is defined in a EXE (executable image), then the method checks the cleanup functions for the EXE to determine if V is freed.

In addition to the cleanup functions, the method may also check other code that manipulate the leaked variable. For example, if the global variable is inserted into a linked list in a function, and if this function can be executed concurrently by multiple threads, and the linked list is not protected by a lock, then this function is checked to determine if this is the cause of the leak.

2. If the previous value of this variable is not free, then this frame may be the leaky frame. This may not always be true as the first time the global variable is assigned, it will not contain a valid block and hence will not be freed.

iii. Class Member Variable: Set Frame=f+1 and repeat step 2 for this class or member variable iv. Parameter (_in): This frame is the leaky frame as it is an _ in parameter.

V. Parameter (_out): Set Frame=F+1 and repeat Step 2 for this parameter.

vi. Return Value: Set Frame=F+1 and repeat Step 2 for the variable that received this return value in F+1

3. If a variable is a class variable that is leaked, it is likely that the class itself is leaked. In this case, the method determines who leaked this class variable.

4. If a variable that holds the only reference to the heap block is ever overwritten within the scope of the variable, then the current function is the likely suspect.

It should be noted that sometimes the variable gets inserted into a linked list. In these cases, the global variable method described previously is used. The method uses several heuristics such as (i) the probability of the stack being a real leak is proportional to the number of leaky stacks (note: the emphasis here is on leaky stacks, not outstanding). Also, the more the number of leaky stacks, the higher probability that this is a real leak. If a stack is a real leak, then it may have several leaky stacks as well as outstanding stacks. If a stack has only one outstanding alloc or (a small number of outstanding allocations), then it is most likely not a leak.

In some embodiments, the call stacks are sorted based on the number of leaked allocations (and not the leak size). The method may not bother filing bugs based on the outstanding call stacks. Once the leak is verified, the method may file a bug if (a) the number of leaky blocks is greater than some set number, such as 5, or (ii) if the leaky function is in a component lower in the dependency hierarchy (such as ntdll).

FIG. 6 may be a graphical illustration of the method in practice. In FIG. 6, memory blocks may be analyzed and blocks Ax 605, Ay 610 and Az 615 are allocated. Blocks Ax are freed 620, but blocks Ay 610 is leaked and block Az 615 remains outstanding. Accordingly, blocks Ay 610 and Az 615 appear on the leak report 625 as leaked block 630 and outstanding block 635. From this report, the leaked blocks 630 and outstanding blocks 635 may be matched to the underlying code to determine the genesis of the leak and a report may be generated to let the code drafter know of the problem. FIG. 6 also illustrates the usefulness of using the method during initial programming such that leaks may be identified before they become large problems. For example, a low level code section may have a leak which may be called by numerous processes, all of which may create another leak, thereby amplifying the effect of the leak.

The method also may be used during initial programming by programmers to identify leaks in code that is being created. In those cases, the leak reports may be stored locally and accessed by the programmer to quickly identify and fix leak problems before code is released.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of determining a cause of a leaked resource in a computer system comprising a processor configured according to computer executable instructions and a memory physically configured to store computer executable instructions comprising physically configuring a processor for:
    setting a leak trigger for starting leak detection;
    if the leak trigger is activated:
        starting leak detection when an application begins;
        tracking resource allocations for the leaked resource; and
        matching each leaked resource to a corresponding allocation call stack; and if the leak trigger is not activated:
            repeating the computer executable instructions; generating a leak report of resource leak data wherein the leak report is stored at least one of locally or communicated to a local aggregation database or remote aggregation database; and comprising at least one of automatically reclaiming the leaked resource and creating a fix to the leaked resource and applying the created fix automatically.

2. The method of claim 1, further comprising identifying a type of the leaked resource.

3. The method of claim 1, further comprising controlling at least one of the leak detection and the leak trigger according to at least one of a local policy and a global policy.

4. The method of claim 3, further comprising dynamically updating at least one of the local and the global policy.

5. The method of claim 3, further comprising updating the global policy using aggregated occurrences of applications that met the local policy.

6. The method of claim 1, further comprising matching a plurality of distinct types of leaked resources to the same call stack.

7. The method of claim 1, wherein the leak report comprises:
- total leaked allocations;
- total size of leaked allocations;
- total outstanding allocations;
- total size of outstanding allocations; and
- matched allocation call stacks.

8. The method of claim 1, further comprising using the leak detector during code testing.

9. The method of claim 1, further comprising setting a global policy to enable leak detection comprising:
- using a first communication channel to control whether to invoke a leak detector; and
- using a second communication channel to communicate a leak report where the leak report is directed to the proper classification at a receiver of the leak report.

10. A method of analyzing leak report data for a computer system comprising a processor configured according to computer executable instructions and a memory physically configured to store computer executable instructions comprising physically configuring a processor for:
- aggregating leak reports for the same component across at least one of multiple applications, users and machines;
- providing the leak reports to developers of the applications;
- comparing similar call stacks across reports from multiple users; and
- performing data flow analysis on the source code identified in the stacks to identify the leaked local variables; prioritizing leak reports based on at least one of the factors comprising application usage, application install base, size of the leak, number of components that use the targeted component, the number of leaked resource, the type of the leaked resource, the frequency of occurrence of the leaked resources.

11. The method of claim 10, further comprising performing control flow analysis to identify the leaked global variables.

12. A method of creating an algorithm to limit performance costs of a leak detector in a computer system comprising a processor configured according to computer executable instructions and a memory physically configured to store computer executable instructions comprising physically configuring a processor for:
- limiting usage of computing overhead;
- maintaining a unique call stack database and all associated data structures in a heap and the heap is maintained in the target process's address space; and
- storing in the call stack database only call stacks of outstanding blocks; generating a leak report of resource leak data wherein the leak report is stored at least one of locally or communicated to a local aggregation database or remote aggregation database; and comprising at least one of automatically reclaiming the leaked resource and creating a fix to the leaked resource and applying the created fix automatically.

13. The method of claim 12, wherein computing overhead comprises limiting at least one of CPU usage, memory usage and network usage.

14. The method of claim 12, further comprising limiting network usage by controlling the size of the files communicated by the method.

15. The method of claim 12, further comprising controlling CPU usage of the leak detector by setting a CPU usage quota by:
- determining a maximum CPU cycles based on CPU frequency and computing CPU cycles for each stack tracing operation and deducted from the quota for the current time interval; and
- computing the quota of CPU cycles to be spent for stack tracing in a fixed time interval.

16. The method of claim 12, further comprising limiting memory by limiting memory usage to a maximum amount.

17. The method of claim 12, further comprising when a resource is allocated or freed, the hash H of the resource identifier RID is computed using the formula:

$$H = \text{SUM byte}[k] * \text{random}[k] \bmod N (\Sigma_{k=0}^{n-1} \text{byte}[k] * \text{random}[k]) \% N,$$

where byte[k] is the kth byte of the RID,
random[k] is the kth slot in the random number table, and
N is size of S, chosen as a prime number.

* * * * *